May 13, 1969  MASATARO FUKUDA ET AL  3,443,999

FUEL CELL SYSTEMS

Filed June 16, 1964  Sheet 1 of 16

FIG. 5
FIG. 6
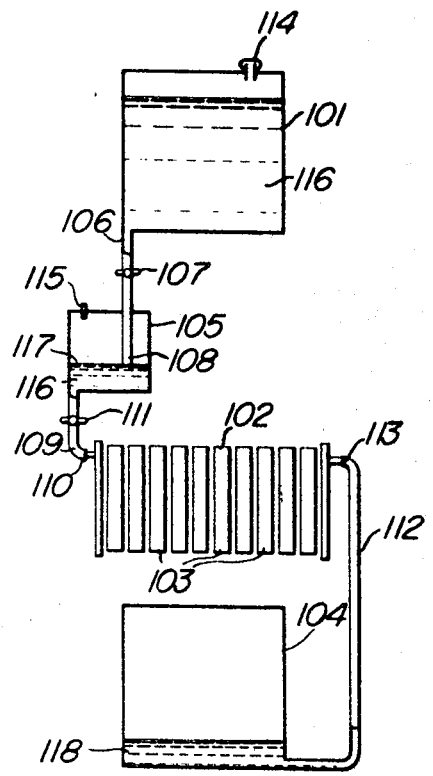
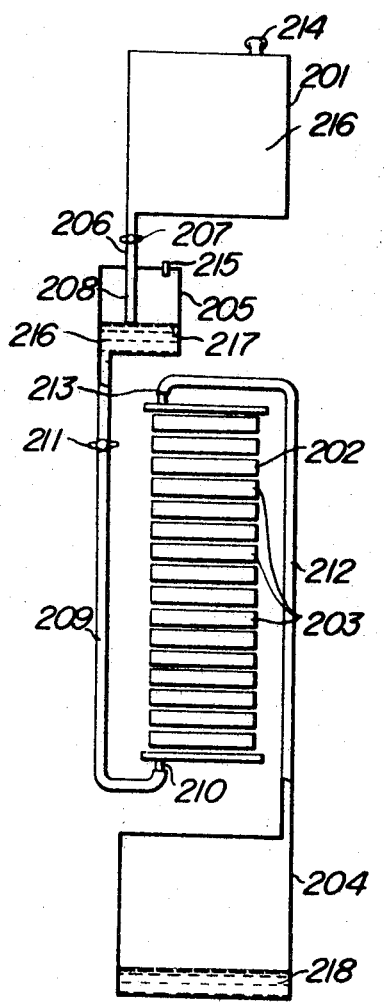

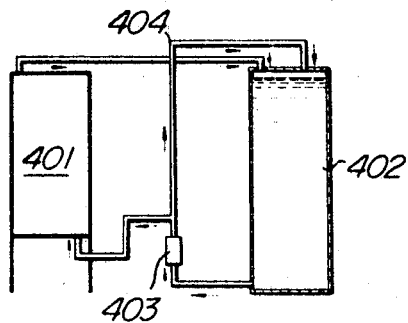
FIG. 18
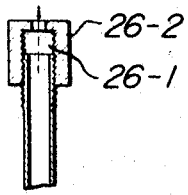
FIG. 22
FIG. 19
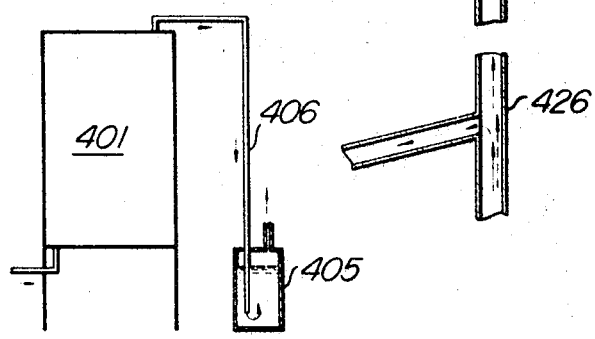
FIG. 20
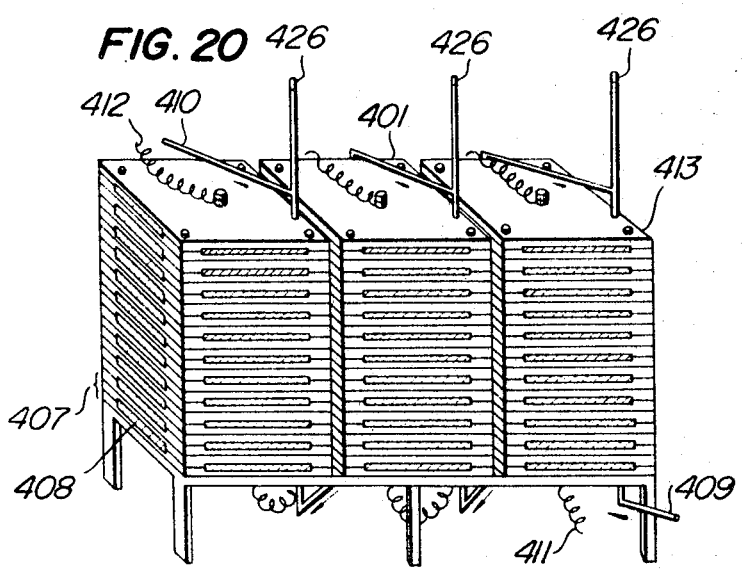

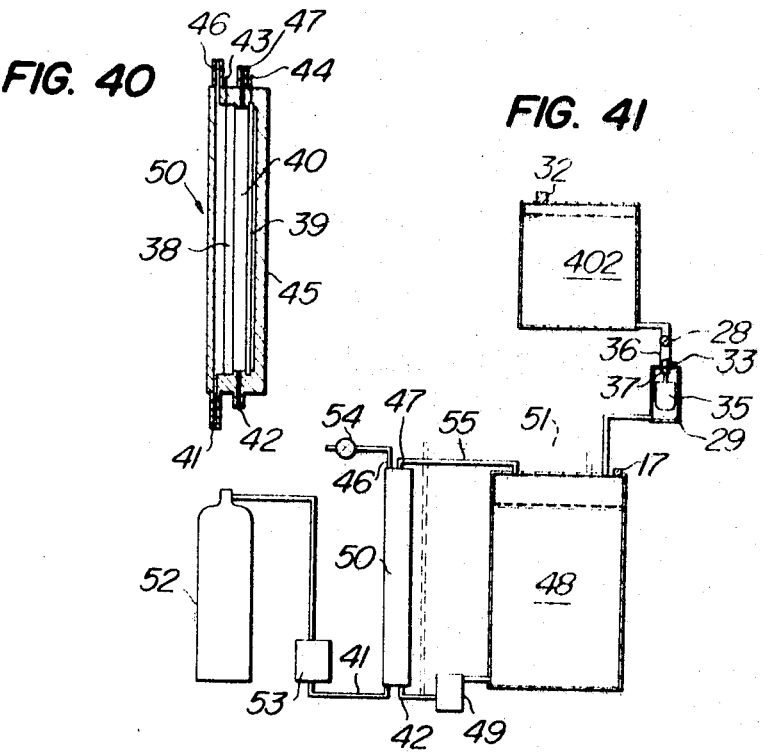

United States Patent Office 3,443,999
Patented May 13, 1969

3,443,999
FUEL CELL SYSTEMS
Masataro Fukuda, Takatsuki-shi, Taketsugu Hirai, Hiraoka-shi, Takashi Hino, Neyagawa-shi, Tomizo Shiramoto, Osaka, and Isoo Sawada and Nobuyuki Yanagihara, Moriguchi-shi, Japan, assignors to Matsushita Electric Industrial Co., Ltd., Osaka, Japan, a corporation of Japan
Filed June 16, 1964, Ser. No. 375,495
Claims priority, application Japan, June 19, 1963, 38/32,399
Int. Cl. H01m 27/12
U.S. Cl. 136—86                                   4 Claims

ABSTRACT OF THE DISCLOSURE

A liquid fuel cell system comprising a fuel cell containing an oxidizing electrode and a fuel electrode is supplied with a liquid fuel from a liquid fuel supply tank connected to the fuel cell through a flow circuit, characterized by means provided in a portion of the flow circuit for maintaining the height (pressure head) of the liquid fuel being supplied relative to the fuel cell substantially constant to continuously supply the liquid fuel while applying a constant liquid fuel pressure thereto. In such a fuel cell it is required to maintain the amounts of oxidizing agent and the liquid fuel constant in order to make the output of the fuel cell constant. The present invention is intended to maintain a liquid fuel pressure applied to the fuel cell constant by a liquid level controlling means.

---

This invention relates to fuel electric cells in which gaseous or liquid fuels are utilized to generate electricity by cell reaction with oxidizing gases or liquids.

The primary object of the present invention is to provide a fuel cell of the kind above-specified, in which gas and liquid pressures, as well as their flow rates in the cell, are automatically kept substantially constant during operation, whereby safe and long-life operation of the cell is assured, with stabilized performance.

There are other objects and particularities of the present invention, which will be made obvious in the following descriptions with reference to the accompanying drawings, in which:

FIGS. 5, 6 and 7 show somewhat diagrammatically three embodiments of the invention as applied to liquid fuel cells, respectively;

FIG. 18 shows a further embodiment of the invention;

FIG. 19 is a detailed view of the pressure regulator used in the embodiment shown in FIG. 18;

FIG. 20 is a perspective view of a methanol fuel cell embodying the invention;

FIG. 22 is a sectional view of the gas-removing device used in the fuel cell shown in FIG. 20;

FIG. 40 shows an oxygen-hydrazine fuel cell;

FIG. 41 shows an embodiment of the invention employing oxygen-hydrazine fuel cells; and FIG. 42 is a performance curve diagram of the cell shown in FIG. 41.

Figure 1:
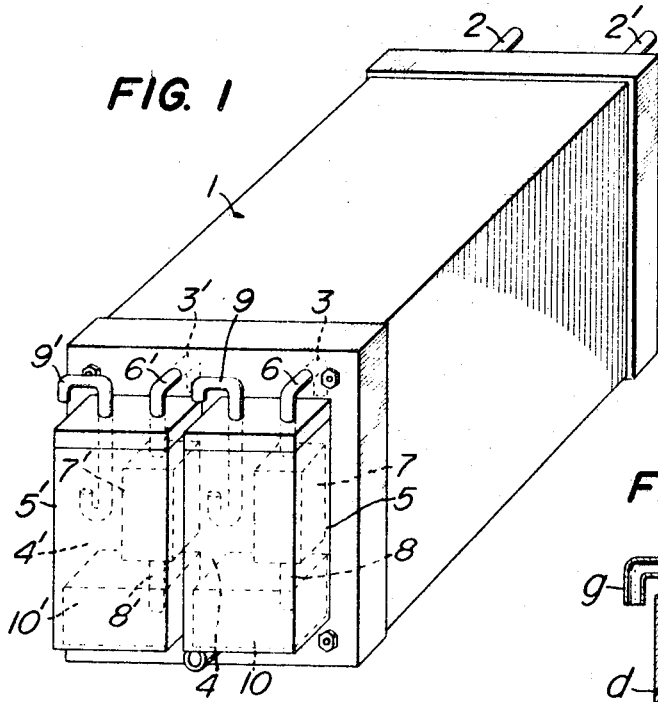
FIG. 1 is a perspective view of one embodiment of the invention.
Figure 2:
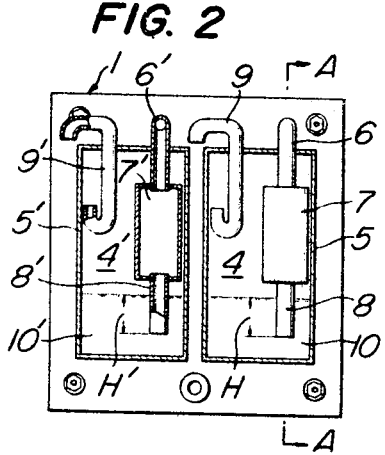
FIG. 2 is an end elevational view of the same, partly in section.
Figure 3:
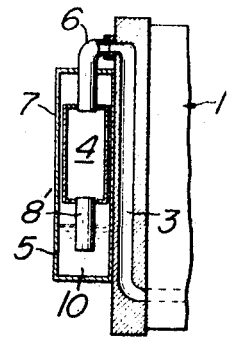
FIG. 3 is a fragmentally sectional view taken at line A—A in FIG. 2.

Referring to FIGS. 1, 2 and 3, a gaseous fuel cell comprises a casing 1 in which are accommodated anode-plate group, cathode-plate group, electrolyte, oxidizing-gas passage, and fuel-gas passage, as is well-known. Oxidizing gas is introduced into the cell through an inlet pipe 2 and exhausted through an exhaust pipe 3, while fuel gas is introduced into the cell through an inlet pipe 2' and exhausted through an exhaust pipe 3'. A pressure regulator 4 is provided for regulating the pressure of oxidizing gas. The pressure regulator 4 comprises a hermetically closed container 5, in which are arranged a gas inlet pipe 6, a liquid tank 7 connected to the gas inlet pipe, a liquid-immersion pipe 8 connected with the tank 7, a gas exhaust pipe 9, and a quantity of pressure-regulating liquid 10 into which the lower open end of pipe 8 is immersed to an appropriate depth. The gas inlet pipe 6 is connected with the exhaust pipe 3. There also is provided a fuel-gas pressure regulator 4' of similar construction, comprising a hermetically closed container 5', a gas inlet pipe 6', a liquid tank 7', a liquid-immersion pipe 8', a gas exhaust pipe 9', and a quantity of pressure-regulating liquid 10', the pipe 6' being connected with the exhaust pipe 3'.

In operation, an oxidizing gas, such as air, oxygen, chlorine, or the like, is introduced into the cell through the pipe 2, and a fuel gas, such as hydrogen, propane, or the like, is introduced thereinto through the pipe 2'. The oxidizing gas then enters into the pores of anode plates, while the fuel gas enters into the pores of cathode plates, and by virtue of the catalizing action of electrode plates and the electrolyte action, the fuel gas is oxidized electrochemically to generate electricity as in well-known.

In such a fuel cell, the pressure of oxidizing gas and that of fuel gas should be regulated in a proper manner, in order to prevent displacement of the electrolyte to one or the other side in the cell, or commingling of one gas into the other, resulting in inoperativeness of the cell. For this purpose, gas pressure regulators 4 and 4' are provided according to the invention. If, by some reason, either of the gas pressures in the cell drops below the atmospheric pressure, and the pressure-regulating liquid 10 or 10' tends to rise into the cell, such rising liquid is held restrained in the liquid tank 7 or 7', and is prevented from rising into the cell proper.

According to the embodiments shown in FIGS. 1 to 3, the oxidizing gas exhaust pipe 3 is connected with the gas inlet pipe 6 of pressure regulator 4, while the fuel gas exhaust pipe 3' is connected with the gas inlet pipe 6' of pressure regulator 4'. The oxidizing gas exhausted from the cell proper and introduced into the liquid tank 7 through pipes 3 and 6, is passed through the pressure-regulating liquid 10 in the tank 7, and through the liquid-immersion pipe 8 to the exhaust pipe 9. As a result, the pressure P of oxidizing gas in the cell proper, the specific density D of liquid 10, and the height H of liquid-immersion pipe 8 from its lower open end to the level of liquid 10, have the following relation:

$$P = H \cdot D$$

That is to say, the pressure of oxidizing gas in the cell is constant, if H and D are kept constant. If, for example, the flow-in rate of oxidizing gas into the cell proper is increased by some reason to raise the oxidizing-gas pressure in the cell, excess gas tends to escape through the liquid 10 to the exhaust pipe 9, thus maintaining the oxidizing-gas pressure constant in the cell. Similar operation takes place in the fuel-gas pressure regulator 4', with similar equation, $P' = H' \cdot D'$. It is preferable that the specific densities of liquids 10 and 10' are selected equal, that is, $D = D'$. By appropriately selecting H and H', the oxidizing-gas pressure and the fuel-gas pressure in the cell can be determined independently from each other, with a predetermined mutual relation, and such a pressure relation is always maintained automatically to assure proper operation of the cell.

Figure 4:
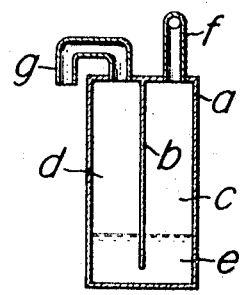
FIG. 4 shows in section a modified form of the gas-pressure regulators.

The gas-pressure regulator 4 may take the form as shown in FIG. 4, in which a closed chamber $a$ is divided into two sub-chambers $c$ and $d$ by a partition wall $b$ extending from the top wall of chamber $a$, but not reaching the bottom wall of the same. The closed chamber $a$ receives pressure-regulating liquid $e$. A gas inlet pipe $f$ is connected to the sub-chamber $c$ at the top thereof, while a gas exhaust pipe $g$ is connected to the sub-chamber $d$ at the top thereof. The operation of the regulator shown in FIG. 4 is not different from that of FIGS. 2 and 3, and need not be explained further.

EXAMPLE 1

An oxygen-hydrogen fuel cell as shown in FIGS. 1 to 3 was made with 158-mm. width, 394-mm. length, and 187-mm. height. The cell was operated with an electrolyte of 50% caustic potash solution. Distilled water (specific gravity=1) was used as the pressure-regulating liquid. Liquid-immersion pipes 8 and 8' of 40-mm. diameter were used, and both the oxygen-gas pressure and the hydrogen-gas pressure were selected and automatically regulated at 40 mm. in water column. The electromotive force of the cell was 10 v. with 15-watt output, and the balance was maintained automatically between the oxygen pressure and hydrogen pressure for a period of time as long as five months, with continued generation of electricity.

Figure 7:
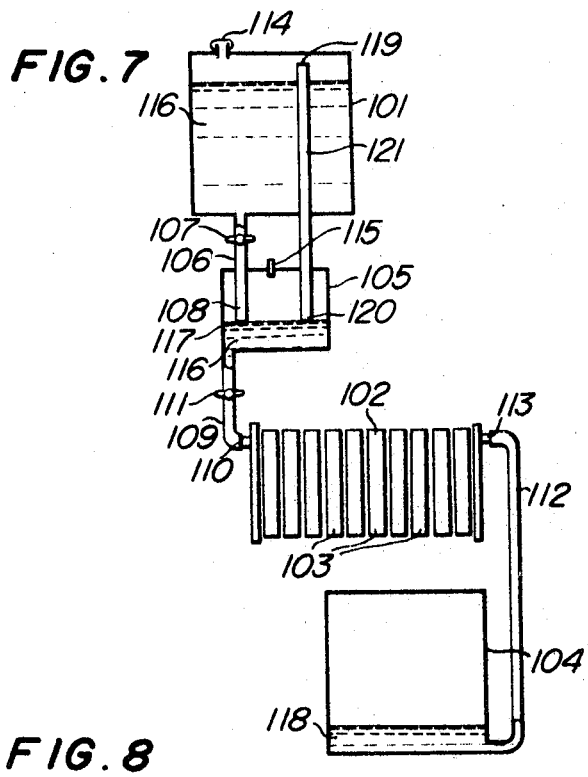

FIGS. 5, 6 and 7, respectively shows liquid fuel cells embodying the present invention. They use liquid fuels, such as methanol, ethylene glycol, hydrazine, or the like, and means are provided for preventing lowering of flow rate of the liquid fuel due to lowering liquid pressure along with consumption of the fuel liquid in the supply tank, to maintain the liquid pressure as well as the flow rate of liquid fuel substantially constant in the fuel cells.

Referring to FIG. 5, the apparatus shown comprises a fuel supply tank 101, a liquid fuel cell 102 consisting of ten unit cells 103 series connected, and arranged with such orientation that electrode plates are disposed vertically, an exhaust tank 104, a liquid-level control tank 105 connected to the fuel tank 101 by a pipe 106 having a fuel supply cock 107 therein, the lower end 108 of pipe 106 opening in the tank 105 at a suitable height, and a connection pipe 109 including therein a flow-rate regulating cock 111, for connecting the tank 105 to the fuel-electrolyte inlet port 110 of the cell 102. The fuel cell 102 has an fuel-electrolyte exhaust port 113 which is connected to the exhaust tank 104 through a pipe 112. The fuel supply tank 101 is provided with an opening hermetically closed by a plug 114 for preventing air flow therethrough. The liquid-level control tank 105 is provided with an air port 115, and receives fuel-electrolyte 116 therein, with its liquid level shown by 117. The exhaust tank 104 receives exhaust liquid 118 therein.

Referring to FIG. 6, the liquid fuel cell apparatus shown comprise a fuel supply tank 201, a likuid fuel cell 202 consisting of 16 unit cells 203 connected together in serier relation and stacked together vertically, an exhaust tank 104, and a liquid level control tank 205 connected with the fuel tank 201 by a connection pipe 206 including a fuel supply cock 207 therein. The lower end of pipe 206 opens in the tank 205 at an appropriate height. The liquid level control tank 205 is connected with a fuel-electrolyte inlet port 210 provided at the lower end of cell 202 through a connection pipe 209 including a flow-rate regulating cock 211 therein. A fuel-electrolyte exhaust port 213 is provided at the top of cell 202, and is connected to the exhaust tank 204 by a connection pipe 212. The fuel supply tank 201 is provided with a top opening closed by a plug 214 which prevents air flow therethrough. The liquid level control tank 205 has a top air port 215, and receives fuel-electrolyte liquid 216 having a level 217. The exhaust tank 204 receives exhaust liquid 218 therein.

In both embodiments shown in FIGS. 5 and 6, the lower ends of connection pipes 108 and 208 are open at a height of say 10 to 15 cm. above the fuel-electrolyte exhaust ports 113 and 213, respectively. The operations of the apparatus shown in FIGS. 5 and 6 are substantially identical, and the operation will be explained below with reference to the apparatus shown in FIG. 5 only.

At first, the cock 107 is closed and the plug 114 is open to feed fuel-electrolyte liquid 116 into the tank 101, and the plug 114 is closed. The cock 107 is then opened while the cock 111 is closed. Fuel-electrolyte liquid 116 flows out from tank 101 to the control tank 105. When the level 117 of liquid in the tank 105 has risen to reach the lower end 108 of pipe 106, the liquid is stopped to flow in the tank 105, because of the fact that the fuel tank 101 is hermetically closed. After then, the cock 111 is opened, and the liquid 116 flows in the fuel cell 102, cell reaction taking place in each unit cell, and flows out through the exhaust port 113. Any excess fuel-electrolyte liquid not having been consumed in the cell reaction flows into the exhaust tank 104.

In the liquid level control tank 105, when the liquid level has been lowered below the lower end 108 of pipe 106 by virtue of flowing out of the liquid, air entering through the air port 115 bubbles up through connection pipe 106 and liquid 116 to the air space in the fuel tank 101, and as a result, a corresponding amount of liquid 116 is allowed to flow in the control tank 105 to maintain the liquid level 117.

By repetition of the above-described operation, the liquid level in the control tank 105 is substantially constant at 117, and the fuel cell 102 is always under a constant liquid pressure, any change in flow rate of fuel-electrolyte liquid in the cell being thus prevented. As a result, flowing-in of fuel-electrolyte into the cell is effected continuously, with its continuous flowing-out, and a stable performance of the fuel cell is obtained.

The liquid level control may, alternatively, be accomplished by means of arrangement shown in FIG. 7, in which an air pipe 121 is provided with its upper end 119 opening in the air chamber above the liquid level in the fuel tank 101, and the lower end 120 opening in the control tank 105 at the same height with the lower end 108 of connection pipe 106.

Figure 8:
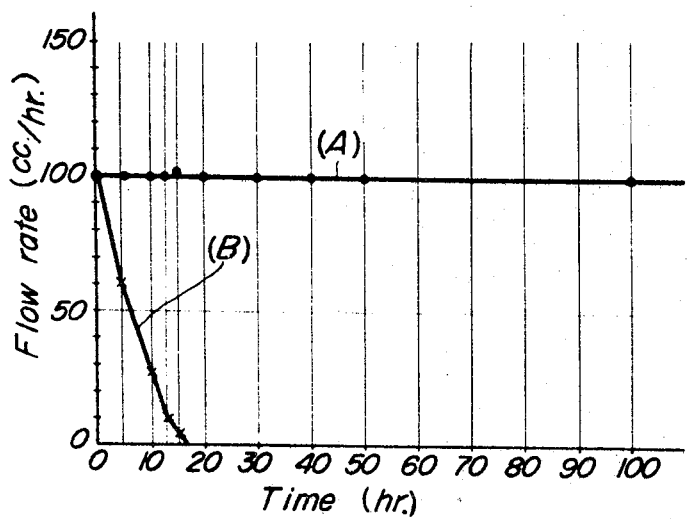
FIGS. 8 and 9 are graphs showing fuel feeding speeds in the embodiments shown in FIGS. 5 and 6, respectively.

The fuel-electrolyte 116 may, for example, consist of 40 parts of methanol, and 60 parts of 40-percent caustic alkali solution. Ten unit cells 113 were employed in the fuel cell 102 as shown in FIG. 5, with the fuel-electrolyte 116 as specified above. This alcohol fuel cell A was capable of discharging 4 amperes in maximum. In 2-ampere continuous discharging of the cell at a flow rate of 100 cc. per hour, there was seen no change in flow rate, with continuous stable discharging. With an alcohol fuel cell B similar to that shown in FIG. 5, except that liquid level control tank 105 was not provided, similar tests were effected. FIG. 8 shows the results of above experiments for comparison to each other. Curve B in FIG. 8 shows that lowering of liquid level in the fuel tank results in lowering of liquid pressure in the fuel cell to lower the flow rate in an extremely short time of operation.

Figure 9:
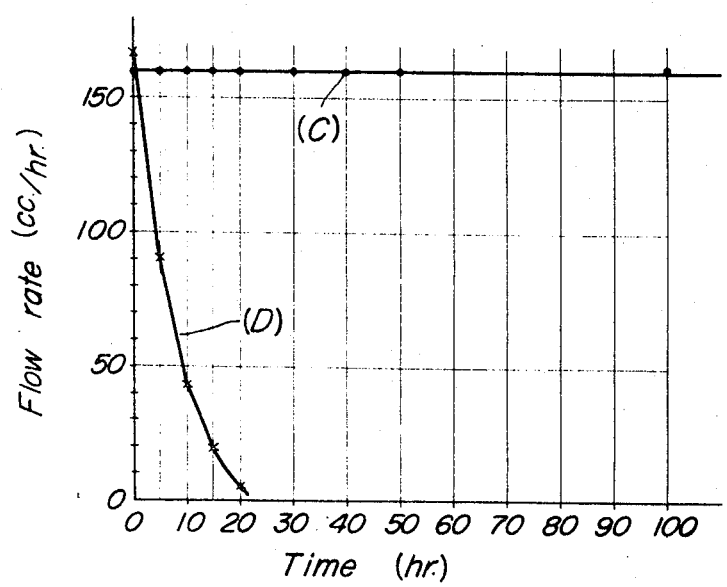

FIG. 9 shows results of experiments on an alcohol fuel cell C as shown in FIG. 6 with 16 unit cells 203 arranged in series. The maximum discharge current of the cell 202 was 4 amperes. There is seen no change in flow rate of the liquid with continuous discharge current of 2-amperes at flow rate of 160 cc. per hour. Similar alcohol fuel cell D not provided with liquid level control tank shows rapid dropping of the flow rate.

Cells A and C have supplied stable current for a period as long as two months without showing any change in the flow rate of liquid fuel-electrolyte.

Figure 10:
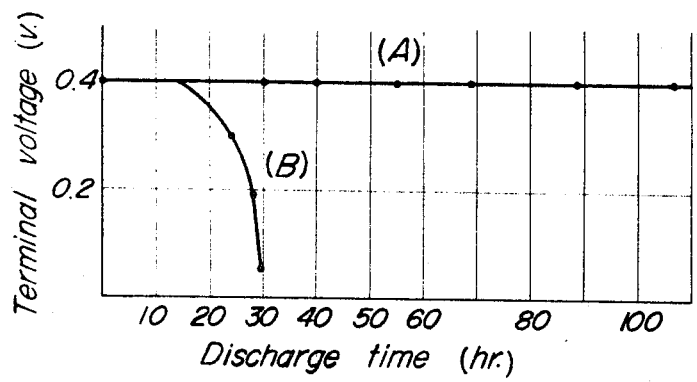
FIG. 10 is a curve diagram showing the discharge performance of the cell shown in FIG. 5.

FIG. 10 shows discharge performances of the above-mentioned alcohol fuel cells A and B, the terminal voltage shown therein being that of a unit cell.

Figure 11:
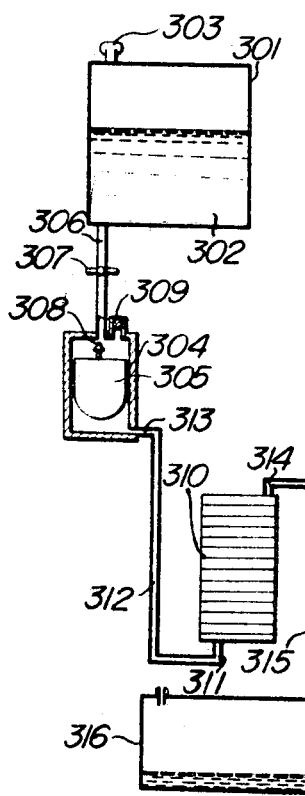
FIG. 11 shows another embodiment of the invention, somewhat diagrammatically.

Referring to FIG. 11, the apparatus shown comprises a tank 301 of mixed fuel and electrolyte liquid 302, having fuel-electrolyte feed opening hermetically closed by a plug 303, a cylindrical liquid-level control tank 304, having a buoy member 305 of cylindrical shape disposed therein. A connection pipe 306 connects the bottom of tank 301 to the top of tank 304, and provided with a cock 307. The buoy member 305 carries at the top thereof a plug member 308 adapted to close the lower end opening of connection pipe 306 when the buoy member 305 has been moved up sufficiently. The control tank 304 is provided with an air port 309 at the top, which port is closed liquid-tightly by a suitable filter which passes air but not liquid.

A connection pipe 312 connects a fuel-electrolyte outlet port 313 of tank 304 to a bottom inlet port 311 of a stacked unit fuel cells 310, a top outlet port 314 of which is connected to an exhaust tank 316 through a connection pipe 315.

The fuel tank 301 is charged with mixed fuel and electrolyte liquid 302 through the top feed opening normally closed by the plug 303. After the plug 303 has been reclosed, the cock 307 is opened, and fuel-electrolyte 302 in tank 301 flows down through the control tank 304 to the fuel cell 310 for effecting cell reaction. The fuel tank 301 being hermetically closed, the pressure in the tank is reduced along with the flowing out of fuel-electrolyte 302, but since the connection pipe 306 is in communication with the atmosphere through the air port 309, the air flows up into the tank 301 for recovering the balance.

On the other hand, when the liquid having flowed into the control tank 304 is too much, the buoy member 305 is moved upwardly to have the plug 308 closing the pipe 306 for stopping further feed of fuel-electrolyte. The fuel-electrolyte in the control tank 304 flows out continuously through the connection pipe 312 and through the fuel cell 310 for effecting cell reaction. Along with such flowing out of fuel-electrolyte, the buoy member 305 moves down to open the pipe 306 into the control tank 304. In this manner, a predetermined amount of fuel-electrolyte is always held in the control tank 304, and assures that the fuel-electrolyte flows through the fuel cell 310 always at substantially a constant flow rate, resulting in stable performance of the cell. The air port 309 is closed by air-permeable but liquid-tight filter, such as of porous carbon body water-tightly treated, and consequently, even when the control tank 304 should be tilted by some reason such as jolting, the liquid therein would not leak out through the port 309. Since the buoy member 305 is of cylindrical form loosely fitting in the cylindrical tank 304, the plug member 308 is assured to be in correct opposition to the lower end opening of connection pipe 306.

The present invention may also be applied to air- or oxygen-methanol fuel cells, for assuring substantially constant and requisite flow rates of methanol through the fuel cells.

In order to have air- or oxygen-methanol fuel cells operating continuously, methanol and electrolyte should be supplied always in fresh conditions, or pumps or the like should be utilized for continuously recirculating methanol and electrolyte through the cells. In this case, if methanol is of low flow-rate, unit or elementary fuel cells remote from the inlet side of methanol and electrolyte are naturally low in output voltage. In an extreme case, even a unit cell near to the inlet port is lower in output voltage than normal. In addition to such lowering of discharge performance of fuel cells as a whole, other difficulties are apt to take place in cell operation, such as gassing or bubbling at fuel electrodes. With regard to requisite flow rate of fuel-electrolyte for safe operation of fuel cells, experiments have been effected for various type of fuel cells, and we have found that the minimum flow rate required for safe operation of air- or oxygen-methanol fuel cells of any type is substantially constant.

According to the invention, the flow rate of methanol in air- or oxygen-methanol fuel cells is always choiced more than 1.5 times the value calculated on the basis of the theoretical value of 4 Faradays per mol of methanol. When methanol and electrolyte once discharged in fuel cells are not reused, the flow rate should be more than the 1.5 times value. In this case, since methanol and electrolyte are not reused, the utilization factor of methanol and electrolyte is increased by more than 1.5 times flow rate, but near to the 1.5 times value as far as possible. When methanol and electrolyte are re-circulated, and if methanol is caused to discharge up to 50%, the residual amount of methanol is 50% when the discharge quantity has reached 50%, and therefore, the 1.5 times flow rate at the minimum can be assured, if the flow rate is made more than 3 times the above-mentioned calculated value, for safe operation of cells without unevenness.

In such a re-circulating system, the relation between the predetermined amount of methanol to discharge and the minimum flow rate for safe operation without unevenness may be represented by $$V = \frac{1.5}{1 - \frac{a}{100}}$$

where V is the requisite minimum flow rate, which is number of times the theoretical value calculated on the basis of 4 Faradays/1 mol of methanol, and $a$ is the predetermined amount of methanol to discharge in percentage.

EXAMPLE 2

An example in which methanol and electrolyte once used are not reused.

The air-methanol cell used was consisting of 10 elementary cells connected in series, and methanol and electrolyte were caused to flow therethrough from one side to the other in series relation.

Methanol-electrolyte used was a mixture of 20 cc. of analytical-reagent-class methanol and 80 cc. of 30% caustic potash solution.

Figure 12:
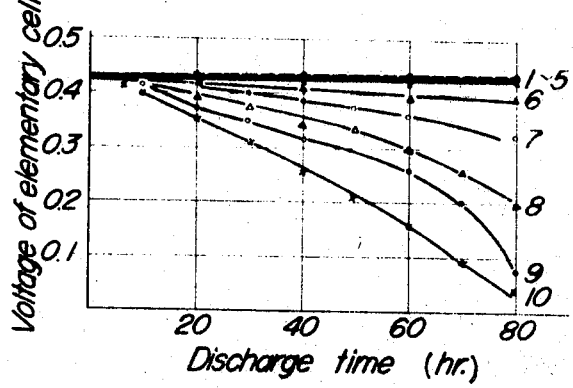
FIGS. 12, 13, 14 and 15 are characteristic curves of a methanol fuel cell embodying the invention.
Figure 13:
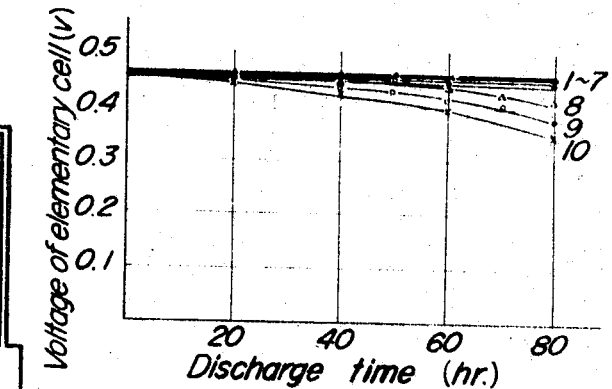
Figure 14:
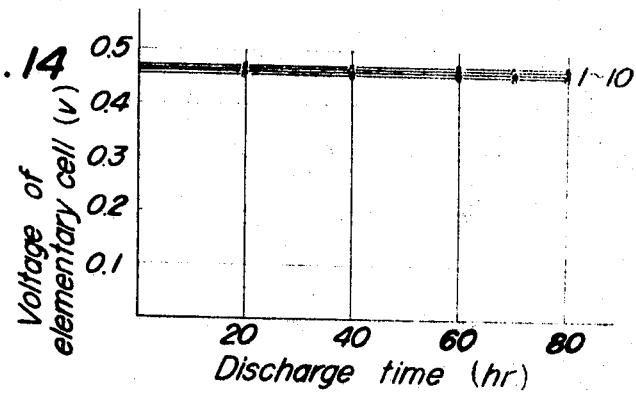

FIGS. 12, 13 and 14 show characteristics of the fuel cells above specified. The cells were continuously discharged at 1 ampere. For 1 ampere-hour discharge, methanol is theoretically required in 1.908 cc./hr. at 4 Faradays per mol. Ten elementary cells were contained in series, and 19.08 cc./hr. was required for 1 ampere-hour discharge. FIGS. 12, 13 and 14 show cell characteristics, respectively, when discharged at flow rates of 21.0 cc./hr. (1.1 times 19.08 cc./hr.), 26.7 cc./hr. (1.4 times 19.08 cc./hr.), and 28.7 cc./hr. (1.5 times 19.08 cc./hr.), respectively. Numbers affixed to respective curves designate order numbers of elementary cells counted from the inlet side of methanol-electrolyte. With more-than-1.5 times flow rates, results substantially same with those shown in FIG. 14 were obtained, and there is not seeen any difference between output voltages of respective elementary cells.

Similar results were obtained for difference ratios of mixture of methanol-electrolyte, different discharge currents, and different numbers of elementary cells in series.

EXAMPLE 3

An example in which methanol-electrolyte is recirculated.

Figure 15:
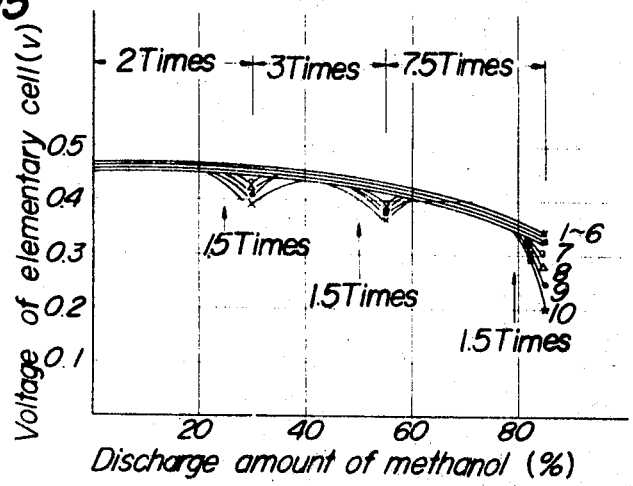

Methanol-electrolyte was recirculated under the same conditions with Example 2, FIG. 15 shows the results. When ten elementary cells in series were discharged by 1 ampere-hour with a flow rate of two times the theoretically requested flow rate, elementary-cells remote from the inlet side were found deteriorated when methanol has discharged by 25% and its flow rate became the 1.5 times value. With 3 times flow rate, elementary-cell voltages raised, but when methanol has discharged by 50%, the remote elementary cell showed deterioration at the methanol flow rate of the 1.5 times. With the 7.5 times flow rate, similar results were obtained. This shows that if the more-than-1.5 times flow rate of methanol is assured, unevenness of elementary-cell voltage is prevented. If, for example, 80% of methanol in the fuel cell system is used, methanol flow rate should be higher than 7.5 times the calculated value with 4 Faradays/1 mol.

In case when liquid fuels or liquid electrolytes are recirculated by use of pumps or the like, the flow rates are regulated by liquid pressures, excess pressure being prevented from being applied to the cells, for preventing leakage of electrolytes or fuels from gas electrodes, thus enabling the cells continuously to operate with required and substantially constant flow rate of the liquid.

When a pump is employed in the re-circulation system, any changes in source voltage or operating temperature of electrically-driven pump would cause over-pressure to be applied to the fuel cell, resulting in leakage of liquid through porous electrodes, which would shorten the useful life of the fuel cell. In other cases, the liquid pressure would drop, and the required flow rate would not be assured.

Figure 16:
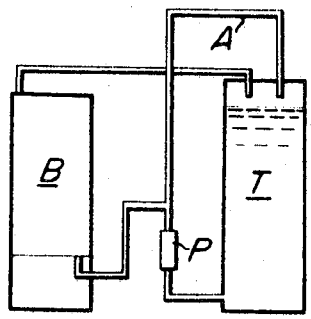
FIG. 16 shows another embodiment of the invention.

According to the embodiment of invention shown in FIG. 16, in which a liquid-driving pump is disposed between the fuel cell and a liquid tank, the liquid driven out by the pump is partly recirculated through the liquid tank, the height of such a recirculating path being resorted to for maintaining the liquid pressure applied to the cell constant.

If the pump used is of high discharge pressure and high flow rate of discharge, such a pump may be utilized without change for various kinds and operating conditions of fuel cells, and by varying the height of the recirculation path, the pump may be utilized without change.

Figure 17:
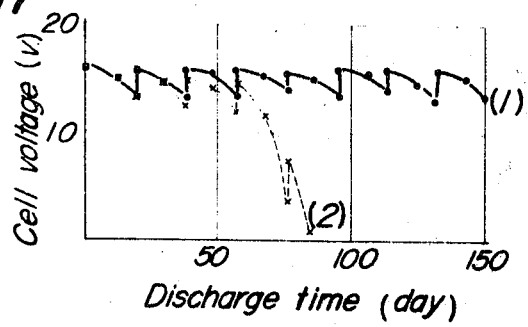
FIG. 17 is a graph showing the performance of the embodiment shown in FIG. 16.

Referring to FIG. 16, the fuel cell B consists of 48 elementary cells connected together in series, and is an air-methanol fuel cell which methanol-caustic potash solution flows through in series relation. A pump P drives the methanol-caustic potash solution in a tank T. The solution consists of 80 cc. of methanol as the fuel and 20 cc. of 30% KOH as the electrolyte. A path A is provided for assuring necessary flow rate through the cell B and for preventing liquid pressure higher than necessary from being applied to the fuel cell. The pump requires current of about 40 ma., in addition to the load current of 120 ma. Consequently, the whole current flowing through the cell B is 160 ma., and the amount of methanol-caustic potash solution required for 160 ma. H discharge is about 14.65 cc./hr., if calculated on the 4 Faradays/1 mol basis. However, when methanol is intended to discharge by 80%, actually required flow rate is 110 cc./hr. The head of methanol-caustic potash solution required for flow rate of 110 cc./hr. should be 50 mm. higher than the top of fuel cell B, for adequately broad range of discharge conditions, such as temperature. Therefore, the head is not required to be higher than 50 mm. That is to say, the path A is established at a height 50 mm. above the top of fuel cell B. The operating characteristics with the 50 mm. height of path H is shown by curve 1 in FIG. 17, in which any deterioration in operating voltage is not seen after 150-day continuous operation. Curve 2 in FIG. 17 shows operating characteristics of similar fuel cell, but not provided with path A, in which the head is actually 300–400 mm. above the top of fuel cell. Moreover, the conventional fuel cell corresponding to curve 2 in operation showed leakage of methanol-caustic potash solution through air electrodes after 25-day discharge, and the solution has covered the whole surface of air side of the electrodes after 84-day discharge. In comparison thereto, the fuel cell of the present invention did not show any leakage even after 150-day continuous operation.

It has now been understood that the present invention contemplates provision of means for regulating the flow rate and/or pressure of electrolyte and oxidizing agent and/or fuel, for stabilizing the operation of gas-diffusion electrodes, resulting in prolonged useful life.

The useful life of a fuel cell employing oxygen electrode, air electrode, hydrogen electrode, or other gas-diffusion electrode utilizing gaseous active material, as the anode and/or cathode, depends upon the nature of electrodes used, and is, in short, determined by how can be maintained the positions of so-called three phase zones where contact between gas, solid and liquid are stabilized for a long period of time. If the electrolyte or its mixture with fuel permeates into electrode pores too deeply, polarization becomes too large, resulting in poor voltage, and if the liquid permeates further to have the gas side of electrode covered by the liquid, the cell becomes almost inoperative. In order to prevent such permeation of liquid, various methods for making electrodes have been proposed, but in vain.

According to the present invention, the pressure of liquid applied to the fuel cell is regulated to assure necessary flow rate of liquid for proper operation of the cell, and at the same time, the pressure of gaseous active material is controlled to assure necessary flow rate, during cell operation.

Referring to FIG. 18, which is similar to FIG. 16, a flow path 404 is provided for circulating the liquid through a liquid tank 402 from between the cell 401 and a liquid driving devices 403, such as pump, and the height of flow path 404 is determined so as to assure the necessary flow rate of liquid for normal operation of the fuel cell, thus maintaining the liquid pressure applied on the cell substantially constant for preventing the cell from being subjected to over-pressure.

In the system of gaseous active material supply, a pressure regulating device is employed for application of pressure that can match the pressure of liquid tending to permeate into electrode pores. Thus, for example, a container 405 is disposed at the gas outlet side of fuel cell 401, as shown in FIG. 19, for containing therein water, mercury or other suitable liquid. The gas outlet pipe 406 is extended into the liquid in container 405 to an appropriate depth for automatically regulating the pressure applied to the gas diffusion electrode to a predetermined value.

Thus, as a whole, the gas and liquid substances are maintained stabilized for a long period of time near at the liquid layer in contact with gas-diffusion electrode, for preventing the liquid from permeating up to the gas side of the electrode and also the gas from reaching the liquid side of the electrode, from whereby the useful life of fuel cell is remarkably extended. For driving the liquid driving pump, and gas feed-in pump, electric power may be supplied from the fuel cell itself or from other source.

EXAMPLE 4

Figure 21:
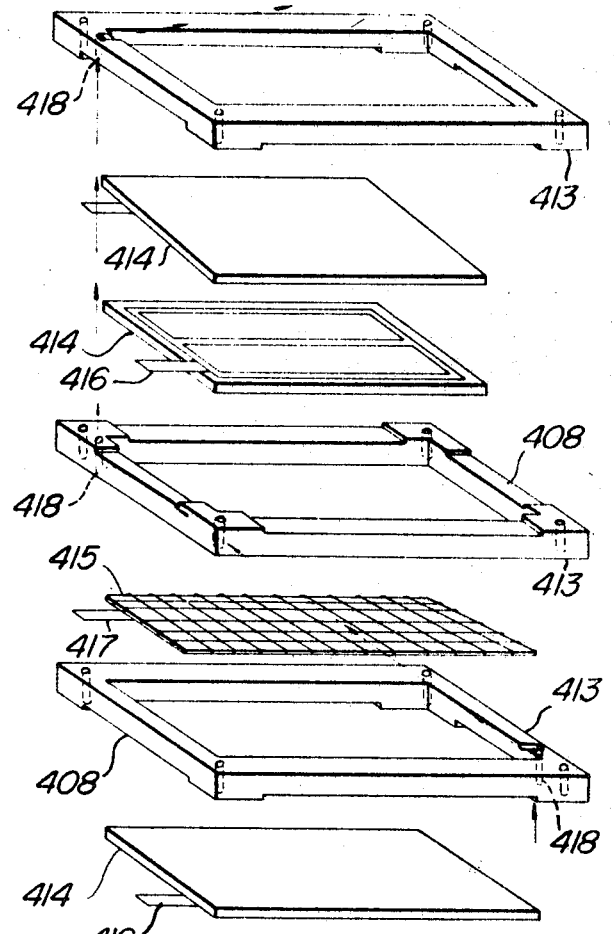
FIG. 21 is an extended view of a unit cell in the embodiment shown in FIG. 20.

In an air-methanol fuel cell as shown in FIG. 20, a mixed liquid of methanol and caustic potash was driven by a liquid driving device. The fuel cell 401 consists of ten elementary cells 407 connected in series as one set, and three similar sets are connected together in series. A mixed liquid of methanol (fuel) and aqueous solution of caustic potash (electrolyte) is introduced through an inlet port 409 and exhausted through an outlet port 410, flowing through respective elementary cells 407 in series relation. Air diffuses at diffusion ports 408, and the load circuit is connected across anode terminal 411 and cathode terminal 412. Each set of elementary cells is fastened together in a stack by means of through bolt 413. Each elementary cell 407 comprises, as shown in FIG. 21, two air electrodes of carbon 414, a fuel electrode 415, and a jair of casing frameworks 413 for holding the electrodes in position. The liquid mixture enters into the casing through a port 418 provided in framework 413, and flows in-between two adjacent air electrodes 414 in contact with fuel electrode 415, to pass to the next elementary cell through a port 418 provided at the opposite side of framework 413, passing through all of 30 elementary cells in series relation, as a whole. Each elementary cell has two anode terminals 416 which are coupled together and connetced to the cathode terminal of adjacent elementary cell.

Any air and other gases that would be in the fuel cell before starting are exhausted therefrom by means of gas removing devices 426, for preventing the liquid mixture from being obstructed to flow therethrough in normal condition. The construction of gas removing device 426 is shown in FIG. 22. The gas is exhausted to oustide the fuel cell through a gas-permeable body 26–1 fixed to the exhaust pipe by means of threaded cap 26–2, as shown by dotted line arrow, while the liquid mixture passes to the next set of cells, as shown by solid line arrow.

Figure 23:
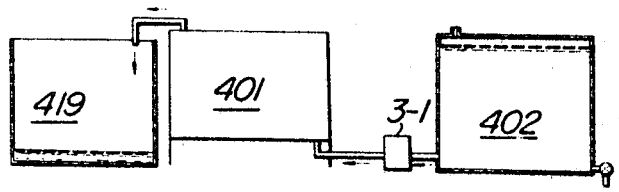
FIG. 23 shows an experiment device used for determination of flow rate.

The height of flow path 404 in FIG. 18 was determined by experiments as shown in FIG. 23. The container 402 received therein a liquid mixture consisting of 20 parts by weight of methanol and 80 parts by weight of 30 percent caustic potash solution. The liquid mixture was driven by a pump 3–1 through the fuel cell 401 consisting of 30 elementary cells as shown in FIG. 20, at different flow rate, and exhausted into a reservoir 419. The fuel cell 401 was operated with discharge current of 1 ampere, and we obtained characteristic curves shown in FIGS. 24, 25 and 26.

As hereinbefore described, it may be assumed that electricity of 4 Faradays is produced by 1 mol of methanol in an elementary cell of this kind, and the theoretical flow rate of the liquid mixture required for continuous discharge at 1 ampere is 1.908 cc./hr. The fuel cell 401 consists of 30 elementary cells in series, and consequently, the theoretical flow rate required for 1-ampere continuous discharge is 57.24 (1.908×30) cc. per hour.

Figure 24:
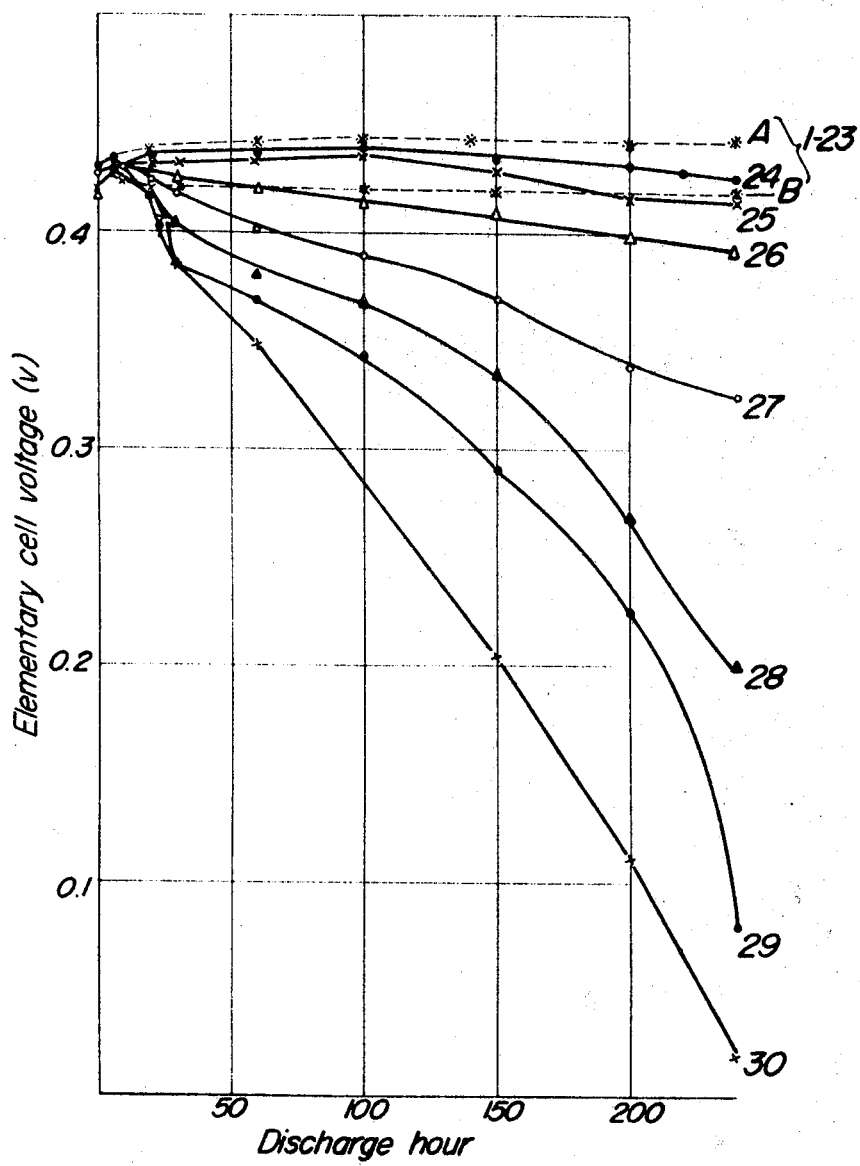
FIGS. 24, 25 and 26 show discharge characteristic curves of the fuel cell shown in FIG. 20.
Figure 25:
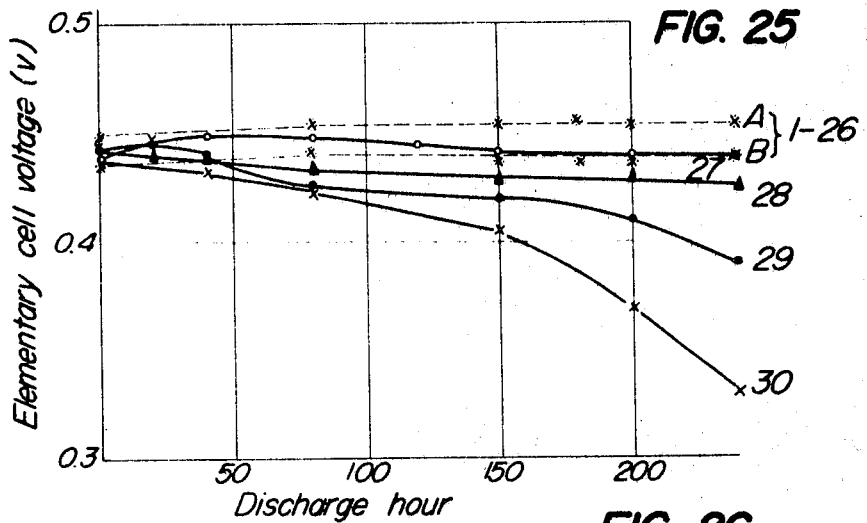
Figure 26:
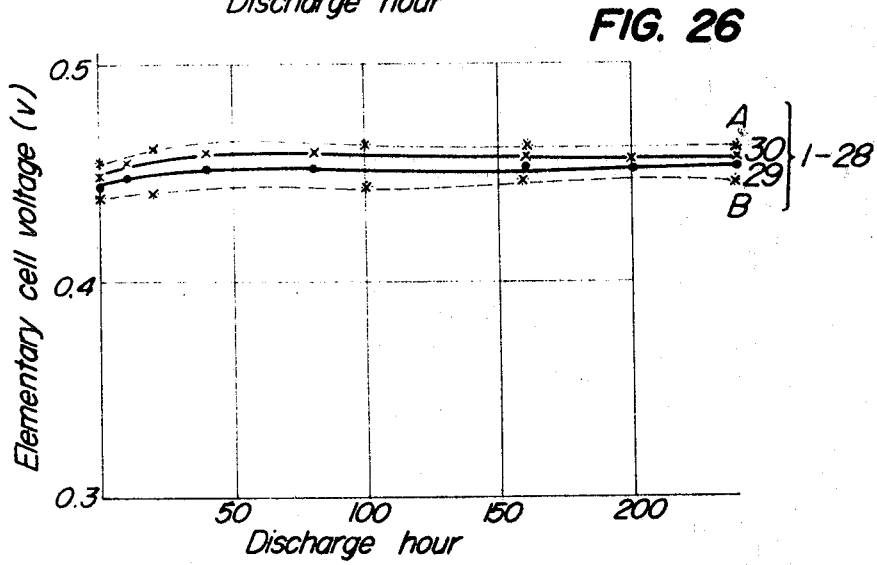

FIGS. 24, 25 and 26 show operating characteristics of fuel cell 401, when the cell was operated with the flow rate of 63.0 cc./hr. (57.24×1.1), 80.2 cc./hr. (57.24 ×1.4), and 85.8 cc./hr. (57.24×1.5), respectively. Numbers affixed to respective curves give order numbers of respective elementary cell from the inlet side of the liquid mixture. With flow rates higher than 1.5 times the theoretical value, results similar to that shown in FIG. 26 were obtained.

Figure 27:
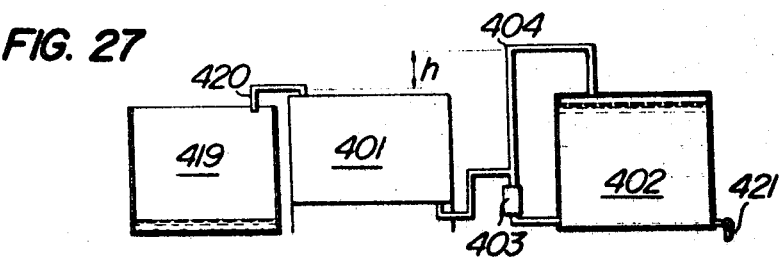
FIG. 27 shows an arrangement for determining liquid pressure.
Figure 28:
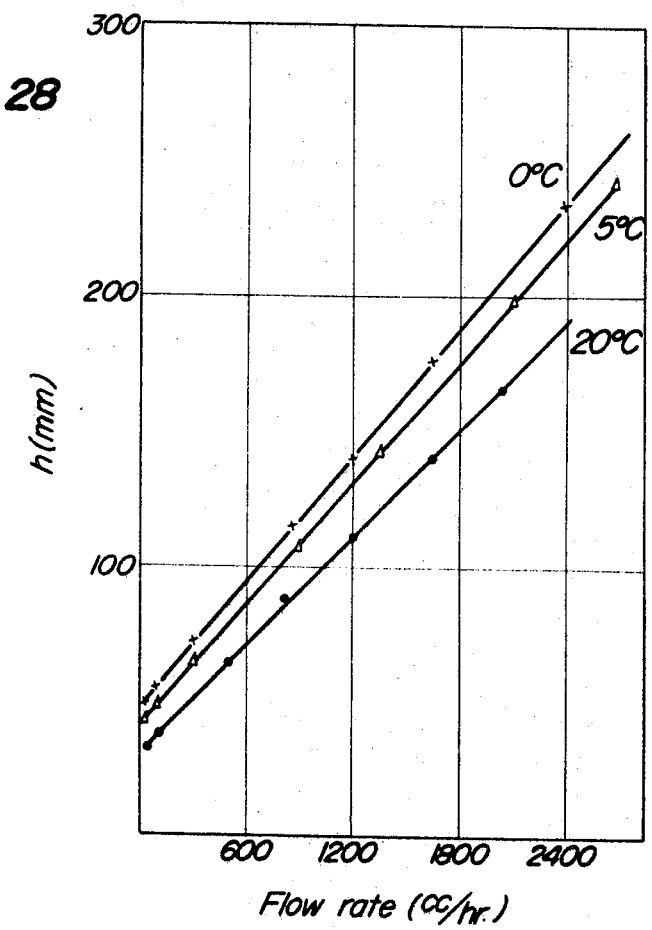
FIG. 28 is a graph showing the relation between flow rate and liquid pressure.

Next, the liquid mixture in container 402 was recirculated as shown in FIG. 27. The liquid driving pump 403 drove the liquid to recirculate through the flow path 404 and container 402, and at the same time, to flow through the fuel cell 401 to the exhaust tank 419 by way of an outlet port 420. The relation between the height $h$ of flow path 404 above the outlet port 420, and the flow rate at the port 420 is shown in FIG. 28. The motor-driven pump 403 was 8 to 14 v. in input voltage, 40 ma. in maximum input current, 6,000 cc./hr. in maximum flow rate, and 100 cm. Hg in head.

Since the flow rate of the liquid mixture required for safe operation of the fuel cell is 85.8 cc./hr. as described hereinabove, it is noted that if $h$ is 60 mm., the required flow rate is assured. At the same time, the pressure of liquid mixture applied to the fuel cell is also maintained at substantially a constant value, but any over-pressure does never act on the fuel cell 401.

Figure 29:
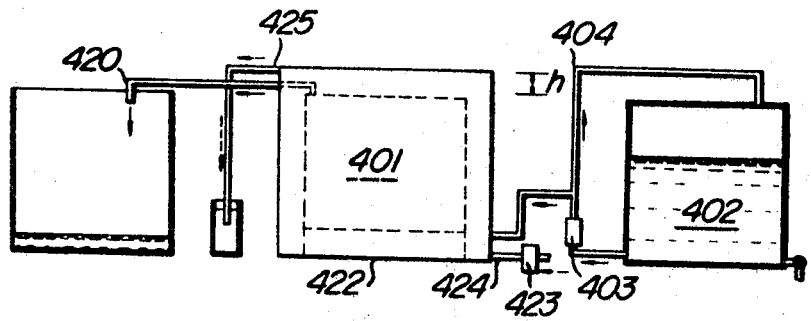
FIG. 29 shows an arrangement for adjusting the pressure of active substance.

As for regulation of pressure of gaseous active substance, explanation is given below with reference to FIG. 29, in which a hermetically closed container 422 encloses the fuel cell 401, and are provided with liquid inlet and outlet, gas removing device, and cell terminals. Air enters into the container 422 through the inlet 424 and goes out through the outlet 425. The motor-driven liquid pump 403 and air pump 423 were energized by electric power supplied by the fuel cell 401 itself. The rating of pump 403 is described hereinabove, and the pump 423 was of about 11.5 watts, about 960 ma. in input current, and 250 l. per hour in flow rate of air. The whole current supplied by the cell 401 was about 2 a., of which about 1 a. was consumed by the motor-driven pumps 403 and 423. Consequently, experiments were carried out with liquid flow rate of 171.6 cc./hr. two times that when pumps 403 and 423 were not energized from the fuel cell 401.

Figure 30:
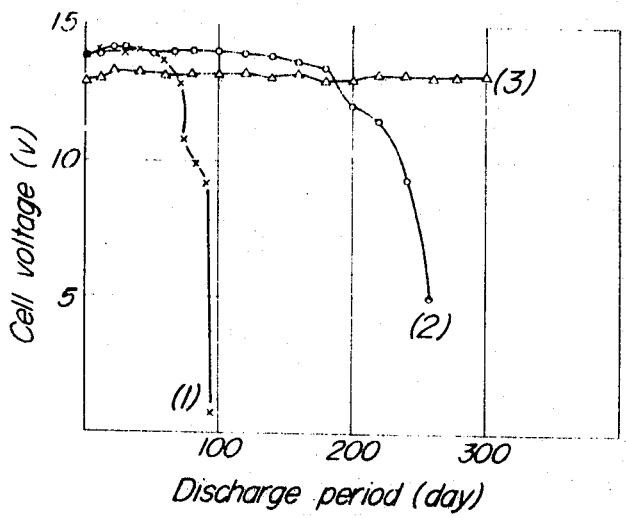
FIG. 30 is a curve diagram showing the discharge characteristics of the cell shown in FIG. 20.

The height $h$ required for keeping the above-mentioned flow rate of liquid was set at 65 mm. as determined by FIG. 28. The air pressure was set at 25 mm. Hg, above which value air is apt to bubble from the liquid mixture in elementary cells remote from the inlet side. The flow rate of air required for 2-ampere discharge is 62.8 l./hr. theoretically, but experiments showed that about two times the theoretical value, that is 125.6 l./hr., is necessary and sufficient. Referring to FIG. 30, curve 3 shows the results of cell operation under the above-mentioned conditions. Curve 1 shows the results of experiments carried out with the arrangement of FIG. 23, in which pump 3–1 was replaced by pump 403 in FIG. 27, and neither the flow rate of liquid mixture nor the pressure applied to fuel cell was controlled. Curve 2 shows the results of experiments carried out with the arrangement of FIG. 27, in which $h$ was set at 60 mm., and flow rate was set at 85.8 cc./hr.

As is clearly seen from FIG. 30, the useful life of fuel cell is about 60 days, if the liquid mixture is merely fed in by a pump, and about 200 days, if a recirculating path is provided at a sufficient height to assure the required flow rate of liquid for regulating the pressure applied to the cell. Further, if the gaseous active substance is fed under pressure which is maintained constant in balance with the liquid pressure, the useful life of fuel cell is longer than 300 days.

If each elementary cell is provided with closed air chamber, and 10 elementary cells are connected together for feeding air therethrough in series relation, the liquid pressure and air pressure are made further balancing by feeding air from the bottom ends of respective sets of 10 elementary cells, in parallel relation.

EXAMPLE 5

In an air-methanol fuel cell, the liquid mixture of methanol and caustic potash was recirculated. Recirculation system is particularly advantageous when fuel liquid and electrolyte are regenerative.

Figure 31:
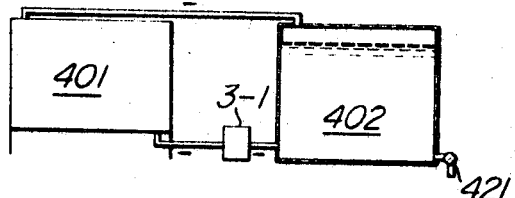
FIG. 31 shows an arrangement for determining flow rates.

Necessary flow rate of the liquid mixture for satisfactory operation of 30 elementary cells connected together in series was determined by use of the arrangement shown in FIG. 31. The fuel cell 401 used in the experiment is that shown in FIG. 20. Discharge of the cell was effected as in Example 4, except that the liquid was recirculated.

Figure 32:
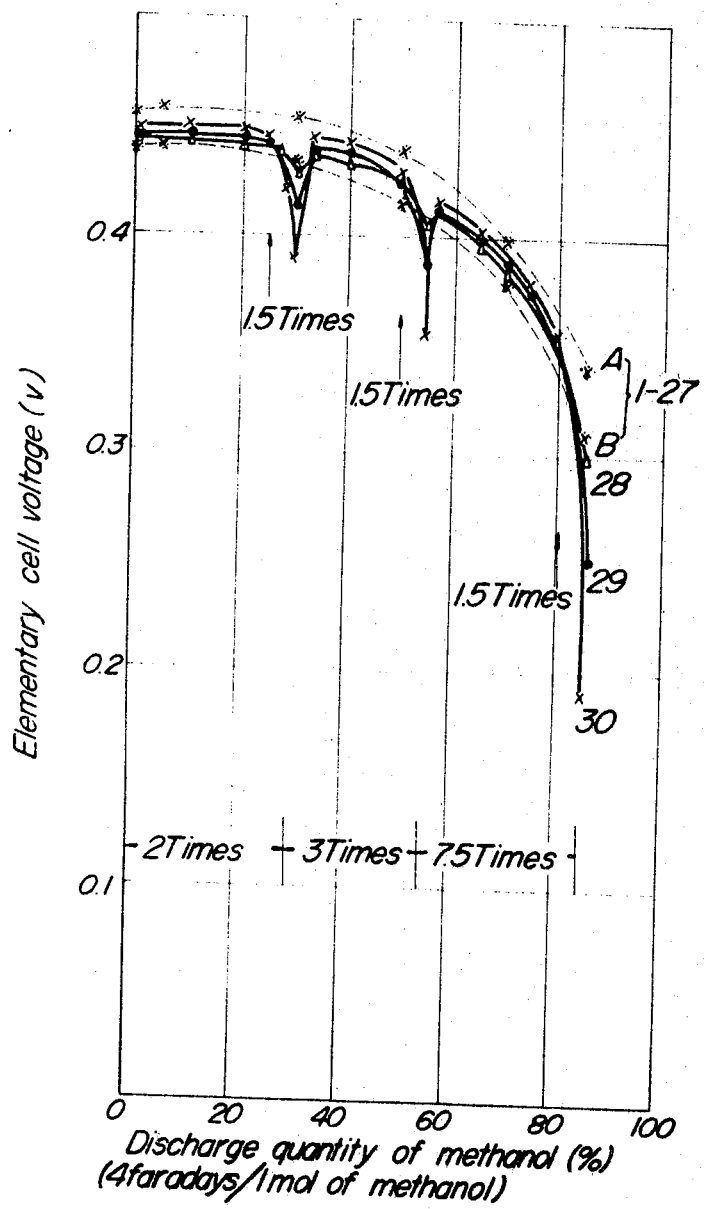
FIG. 32 is a discharge characteristic curve diagram.

FIG. 32 shows the results of experiments. First, the fuel cell was discharged at 1 ampere with liquid flow rate of 2 times the theoretical value on the basis of 4 Faradays per mol of methanol, and when methanol had discharged by 25%, elementary cells remote from the inlet side of liquid showed deterioration in voltage. When methanol had discharged by 30%, the flow rate was increased to 3 times the above-mentioned theoretical value, and the deteriorated elementary cells recovered their voltages to normal, but when they had discharged by 50%, their voltages dropped. Even with 7.5 times flow rate, their voltages dropped at 80-percent discharge. The ratio $v$ of flow rate of undischarged methanol to the theoretical value of flow rate on the basis of 4 Faradays per mol of methanol is $$v = V(1 - a/100)$$

where $V$ is the ratio of flow rate of discharged methanol to the above-mentioned theoretical value, and $a$ is discharge quantity of methanol. If, now, $V=2$ and $a=25$, $V=3$ and $a=50$, and $V=7.5$ and $a=80$, are substituted in the above equation, respectively, $v=1.5$ in respective cases. Thus, it is understood that if the liquid flow rate is 1.5 times the theoretical value, the fuel cell always operates in the normal manner without unevenness in elementary-cell voltages. This is true for different discharge currents, liquid formations and cell constructions. Thus, the necessary flow rate of liquid mixture, when the same is recirculated, is as follows:

$$V = 1.5/1 = a - 100$$

Figure 33:
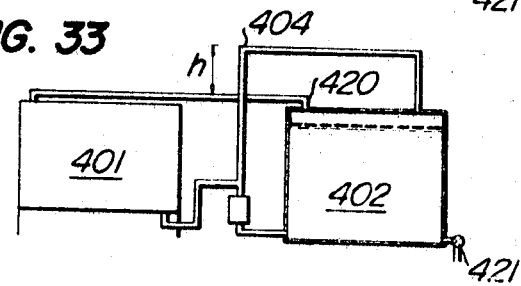
FIG. 33 shows an arrangement for experimentally determining liquid pressure.

Next, by the use of the arrangement shown in FIG. 33, experiments were made under the same conditions as in Example 4, except the recirculation of liquid, and the results obtained are similar those shown in FIG. 28. In order to have methanol discharged up to 80% at 1 ampere without deterioration of elementary cell voltages, the necessary flow rate of liquid mixture is 57.24 × 7.5 = 429 cc./hr., as is obtained from the above results. If $h=100$ mm., the flow rate is assured to be 662 cc./hr., and the liquid pressure on the cell can be maintained constant, without danger of the cell being subjected to overpressure.

Figure 34:
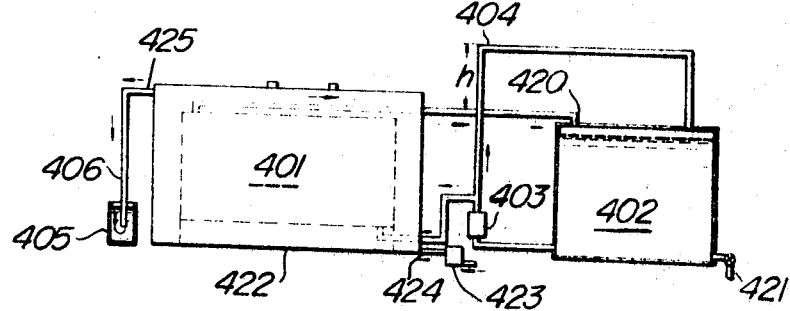
FIG. 34 shows a pressure-adjusting device for gaseous active substance.
Figure 35:
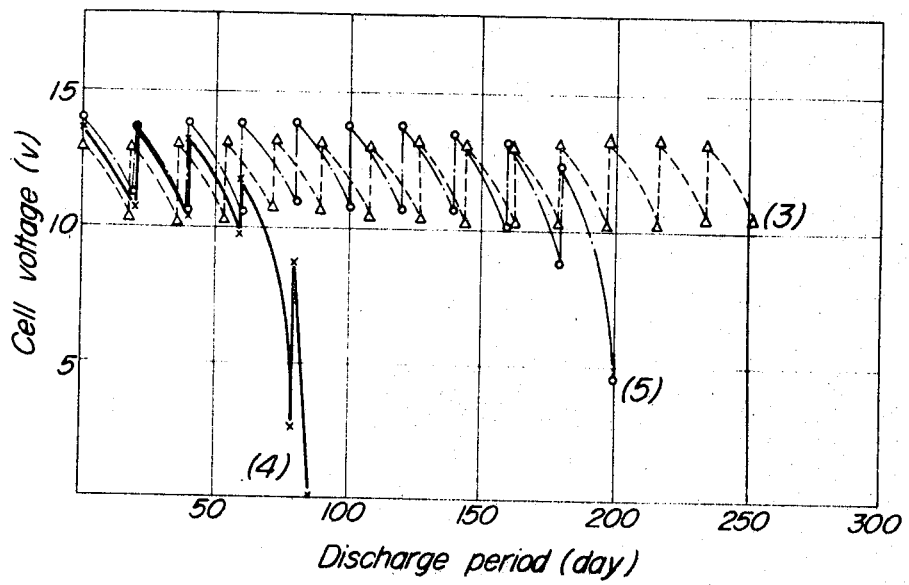
FIG. 35 is a discharge characteristic curve diagram.

With regard to regulation of pressure of gaseous active substance which the cell is subjected to, experiments were effected by use of the arrangement shown in FIG. 34. The experiments were made under similar conditions as in Example 4 employing the arrangement of FIG. 29. However, in the instant experiments, the liquid mixture in the recirculating system was renewed when methanol had discharged by 80% on the basis of 4 Faradays per mol of methanol. The flow rate of liquid mixture was set at 858 (=1.908×2×30×7.5) cc./hr. from the aforementioned results, and the height $h$ of recirculation path was set at 110 mm. from FIG. 28. The air pressure was set at 30 mm. Hg. Curve 3 in FIG. 35 shows operating characteristics obtained by the above experiments. For comparison, curves 4 and 5 are shown in FIG. 35. Curve 4 shows the results of experiments with the arrangement of FIG. 31 in which pump 3-1 was replaced by pump 403 in FIG. 27, and without controlling the flow rate and pressure of the liquid mixture, while curve 5 shows the results of experiments, with the arrangement shown in FIG. 33, in which $h=100$ mm. and flow rate is 429 cc./hr.

As is seen from FIG. 35, the operating life is about 50 days, when the liquid is circulated by the driving pump only, but when a recirculation path is provided with its height sufficient to control the liquid pressure appropriately, the operating life becomes about 160 days. Further, if gaseous active substance is fed under pressure for assuring balance of pressures, the operating life is so extended that there is seen no change even after 230 days of operation.

EXAMPLE 6

In air-methanol fuel cell, the liquid mixture may be supplied by utilization of gravitational force, if the liquid mixture is not recirculated, and the flow rate and liquid pressure may be controlled as desired by use of liquid-level control device as shown in FIG. 11.

Figure 36:
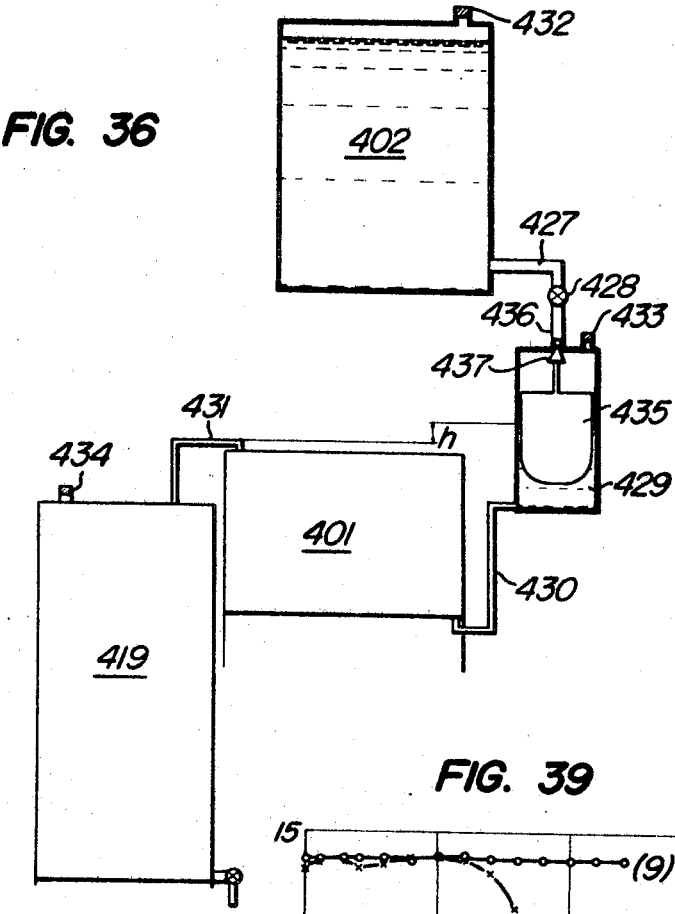
FIG. 36 shows somewhat diagrammatically a further embodiment of the invention.

Referring to FIG. 36, the liquid mixture in the tank 402 flows down through a pipe 427 and an adjustable cock 428 into a liquid-level control device 429, and through an inlet pipe 430 and the fuel cell 401, is exhausted by way of a pipe 431 into the exhaust tank 419. The control device 429 comprises a buoy member 439 carrying a valve element 437 in cooperation with the lower end opening 436 of pipe 427. The device is also provided with air port 433. The flow rate of liquid in the cell 401 and the liquid pressure acting in the cell are thus maintained substantially constant, as hereinbefore explained with reference to FIG. 11. Air ports 432, 433 and 434 are closed by liquid-tight but gas-permeable porous plugs, respectively.

Figure 38:
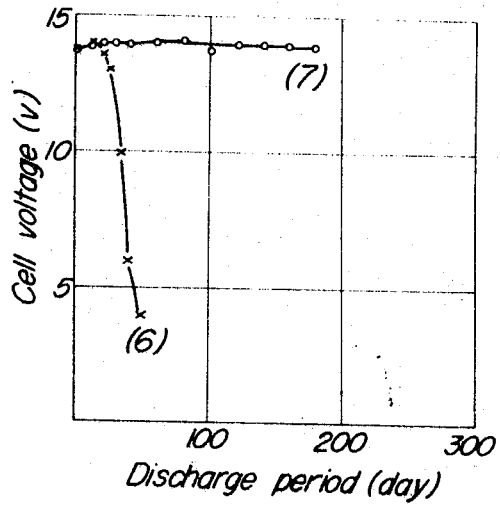
FIGS. 38 and 39 are discharge characteristic curve diagrams.

The flow rate of the liquid mixture required for discharging the fuel cell 401 at 1 ampere output is 85.8 cc./hr., as described in Example 4. The relation between the height $h$ and flow rate is similar to that shown in FIG. 28, and with $h=60$ mm., satisfactory results were obtained. In FIG. 38, curve 7 shows the results of the above experiments, while curve 6 shows the results of experiments effected with the arrangement of FIG. 36, in which the liquid-level control device 429 was omitted. Utilization factor of methanol for curve 7 was 61%, while that for curve 6 was only 35%.

EXAMPLE 7

Oxygen-methanol fuel cell under experiments was that shown in FIG. 20, with the oxygen diffusion ports 408 closed and oxygen being fed into gas chambers provided in the cell casing through suitable ports. Oxygen was regulated in pressure by an external automatic regulator to 25 mm. Hg when the liquid mixture was partly recirculated through the bypass, and to 90 mm. Hg when the latter was not recirculated through a bypass. Discharge current was 1 ampere in either case. The results are shown in FIG. 39.

Figure 37:
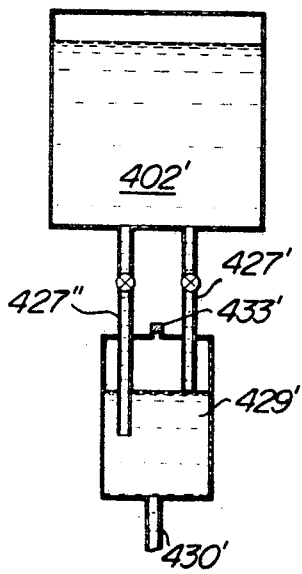
FIG. 37 shows another example of liquid-surface control.

The liquid-level control device may take the form as shown in FIG. 37. The liquid mixture in the tank 402' flows down through the control device 429' to the inlet pipe 430'. When the liquid level is lowered in the control device 429', air enters thereinto through the gas permeable plug 433' and into the tank 402' through the pipe 427' up to the air chamber above the liquid level therein, and allows the liquid therein to flow down through the other pipe 427", thus recovering the liquid level in the control device up to the lower end of the pipe 427'.

Figure 39:
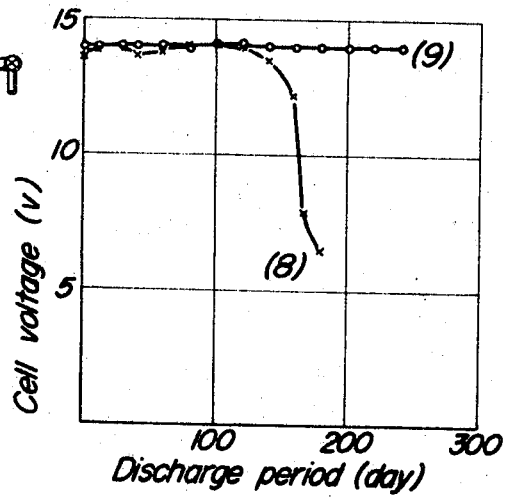

In FIG. 39, curve 9 shows the results of experiments on our new fuel cells, while curve 8 shows the results of experiments on conventional ones, as hereinabove described.

EXAMPLE 8

An oxygen-hydrazine fuel cell 50 was made as shown in FIG. 40. It comprises a carbon electrode 38, a fuel electrode 39, a liquid chamber 40 defined between the two electrodes for receiving liquid mixture consisting of 95 parts by volume of 30-percent aqueous solution of caustic potash (electrolyte) and 5 parts by weight of hydrazine hydrate (fuel), an oxygen inlet 41, an oxygen outlet 46, an inlet 42 and an outlet 47 of the liquid mixture, cell terminals 43 and 44, and a casing 45 of ployvinyl chloride for enclosing the cell elements described above.

Referring to FIG. 41, the above-mentioned liquid mixture is contained in a tank 48, and fed into the fuel cell 50 by a pump 49. The amount of hydrazine hydrate that had been consumed by discharge was supplemented by a liquid-level control device 29 as explained in Example 6. Tank 402 receives the liquid mixture, and is provided with a top port closed by an air permeable but waterproof plug 32. Oxygen is supplied from a bomb 52 to the fuel cell 50, by way of an automatic gas pressure regulator 53, known per se, and in the fuel cell 50, oxygen flows from the inlet 41 to the outlet 46, at the highest pressure that oxygen does never permeate through the electrode 38 into the liquid chamber 40. The liquid mixture is recirculated through the cell and tank 48, by way of a pipe 55, or through a pipe 51 bypassing the cell 50, and the oxygen exhaustion may be controlled by a cock 54.

The results of experiments done on the fuel cell 50 is shown in FIG. 42, in which curve 10 corresponds to the fuel cell with no provision of recirculation system, while curve 11 corresponds to the fuel cell with provision of recirculation system.

What is claimed is:

1. A liquid fuel cell system comprising fuel cell containing an oxidizing electrode supplied with a gaseous oxidizing agent and a fuel electrode supplied with a liquid fuel, a liquid fuel supply tank connected to the fuel cell through a flow circuit, and control means for maintaining the pressure head of the liquid fuel being supplied to the fuel cell substantially constant to continuously supply the liquid fuel while applying a constant liquid fuel pressure thereto, said control means comprising a casing connected at its upper end to said fuel supply tank by an inlet opening provided in said casing and connected at its lower end to said fuel cell, a buoy member disposed in said casing and having a cross-section substantially complementary to that of said casing, said buoy member carrying at its upper end a valve member cooperating with said inlet opening to selectively regulate liquid fuel flow from said fuel supply tank into said casing at a rate at which the fuel is used in the fuel cell, said buoy member and said valve member being positioned so that, when the normal predetermined level of the liquid fuel in the casing is reached, said valve member prevents further flow through said inlet opening, and an air port provided adjacent the upper end of said casing above the normal liquid level in said casing to vent air to the atmosphere.

2. A liquid fuel cell system comprising a fuel cell containing an oxidizing electrode supplied with a gaseous oxidizing agent and a fuel electrode supplied with a liquid fuel, a liquid fuel supply tank connected to the fuel cell through a flow circuit, and control means for maintaining the pressure head of the liquid fuel being supplied to the fuel cell substantially constant to continuously supply the liquid fuel at a rate at which the fuel is used in the fuel cell while applying a constant liquid fuel pressure thereto, said control means comprising a casing disposed within said flow circuit between said fuel supply tank and said fuel cell, first conduit means forming a part of said flow circuit leading from said liquid fuel supply tank to said casing, said first conduit means having its discharge end terminating at a predetermined normal level of the liquid fuel in said casing, second conduit means forming a part of said flow circuit and connecting a lower portion of said casing to said fuel cell, and an air port provided with in said casing above the predetermined normal level of the liquid fuel.

3. A liquid fuel cell system according to claim 2, further comprising an air flow conduit having a lower end disposed in said casing at the level of the predetermined liquid fuel level and having its upper end disposed in said fuel supply tank above the level of the liquid fuel therein.

4. A liquid fuel cell system comprising a fuel cell containing an oxidizing electrode supplied with a gaseous oxidizing agent and a fuel electrode supplied with a liquid fuel, a liquid fuel supply tank, conduit means leading from said fuel supply tank to said fuel cell, a pump disposed in said conduit means, and a bypass connected to said conduit means downstream of said pump and discharging into said fuel supply tank, said bypass being positioned to have a portion thereof disposed at a level above the level of the liquid fuel in said fuel cell to establish a pressure head corresponding to a predetermined pressure at which the liquid fuel is to be supplied to said fuel cell via said conduit means.

References Cited

UNITED STATES PATENTS

| | | | |
|---|---|---|---|
| 1,842,292 | 1/1932 | Sartakoff | 137—398 |
| 2,917,071 | 12/1959 | Crumley et al. | 137—251 |
| 2,925,454 | 2/1960 | Justi et al. | 136—86 |
| 3,253,957 | 5/1966 | Turner et al. | 136—86 |
| 3,267,964 | 8/1966 | Steinmetz | 137—93 |
| 3,143,440 | 8/1964 | Hunger et al. | 136—86 |
| 1,972,962 | 9/1934 | Weber | 137—454 |
| 3,102,058 | 8/1963 | Jones | 136—90 |
| 2,140,432 | 12/1938 | Nomiya | 137—453 |

WINSTON A. DOUGLAS, *Primary Examiner.*

HUGH A. FEELEY, *Assistant Examiner.*